US009202340B2

(12) United States Patent
Losica

(10) Patent No.: US 9,202,340 B2
(45) Date of Patent: Dec. 1, 2015

(54) METHOD AND APPARATUS FOR PREVENTING COLLUSIONS IN ONLINE GAMES

(75) Inventor: Idan Losica, Douglas (GB)

(73) Assignee: PLAYTECH SOFTWARE LIMITED, Douglas (IM)

( * ) Notice: Subject to any disclaimer, the term of this patent is extended or adjusted under 35 U.S.C. 154(b) by 908 days.

(21) Appl. No.: 12/522,098

(22) PCT Filed: Sep. 20, 2007

(86) PCT No.: PCT/IB2007/053827
§ 371 (c)(1),
(2), (4) Date: Jul. 2, 2009

(87) PCT Pub. No.: WO2008/084344
PCT Pub. Date: Jul. 17, 2008

(65) Prior Publication Data
US 2010/0035694 A1   Feb. 11, 2010

(30) Foreign Application Priority Data

Jan. 4, 2007 (WO) .................. PCT/IB2007/050023

(51) Int. Cl.
*A63F 13/00* (2014.01)
*A63F 9/24* (2006.01)
*G07F 17/32* (2006.01)
*A63F 13/75* (2014.01)

(52) U.S. Cl.
CPC ............ *G07F 17/3269* (2013.01); *A63F 13/75* (2014.09); *G07F 17/32* (2013.01); *G07F 17/3241* (2013.01)

(58) Field of Classification Search
CPC ........................................................ A63F 13/75
USPC .................................... 463/10, 16, 25, 29, 42
See application file for complete search history.

(56) References Cited

U.S. PATENT DOCUMENTS

| 6,983,266 | B1 * | 1/2006 | Goldschmidt .................. 706/52 |
| 7,169,050 | B1 * | 1/2007 | Tyler ............................... 463/42 |
| 7,433,943 | B1 * | 10/2008 | Ford .............................. 709/223 |
| 7,604,541 | B2 * | 10/2009 | Aikin et al. ..................... 463/42 |

(Continued)

FOREIGN PATENT DOCUMENTS

| EP | 0 479 449 A1 | 4/1992 |
| EP | 1 642 626 A1 | 4/2006 |

(Continued)

OTHER PUBLICATIONS

"Poker Room Collusion" (No Date), PokerRoomCollusion.com.*

(Continued)

*Primary Examiner* — Lawrence Galka
(74) *Attorney, Agent, or Firm* — Oliff PLC

(57) ABSTRACT

A method and apparatus for preventing collusion or collusion attempt situation within an online computerized gaming environment, wherein an at least one player participates from a remote computing platform in one of more games. The method and apparatus comprise defining the collusion or collusion attempt situations, defining preventive actions to be taken in response to collusions or collusion attempts, associating the situations with actions, determining collusion or collusion attempt situation in run time, selecting one or more actions, and performing the actions to prevent the collusion.

13 Claims, 3 Drawing Sheets

(56) References Cited

U.S. PATENT DOCUMENTS

| | | | |
|---|---|---|---|
| 7,883,412 B2* | 2/2011 | Daniel et al. ................... | 463/29 |
| 2001/0031663 A1* | 10/2001 | Johnson ........................ | 463/42 |
| 2003/0228910 A1 | 12/2003 | Jawaharlal et al. | |
| 2004/0071164 A1 | 4/2004 | Baum | |
| 2005/0278542 A1 | 12/2005 | Pierson et al. | |
| 2006/0048211 A1 | 3/2006 | Pierson et al. | |
| 2006/0068871 A1 | 3/2006 | Crawford, III et al. | |
| 2006/0121968 A1 | 6/2006 | Daniel | |
| 2006/0205489 A1 | 9/2006 | Carpenter et al. | |
| 2006/0277098 A1* | 12/2006 | Chung et al. ................... | 705/14 |
| 2007/0015584 A1* | 1/2007 | Frenkel .......................... | 463/42 |
| 2007/0155460 A1* | 7/2007 | Burnside et al. ............... | 463/42 |
| 2008/0032800 A1* | 2/2008 | Liu et al. ....................... | 463/42 |

FOREIGN PATENT DOCUMENTS

| | | |
|---|---|---|
| GB | 2 410 402 A | 7/2005 |
| JP | A 2001-350687 | 12/2001 |
| WO | WO 2004/071601 A2 | 8/2004 |
| WO | WO 2005/110565 A2 | 11/2005 |
| WO | WO 2006/075825 A1 | 7/2006 |
| WO | WO 2006/127795 A2 | 11/2006 |

OTHER PUBLICATIONS

"Archive Poker Room Collusion" (Jan. 8, 2007 as established by archive.org), PokerRoomCollusion.com.*

International Search Report issued in International Patent Application No. PCT/IB07/50023, on Feb. 1, 2008.

Written Opinion of the International Searching Authority issued in International Patent Application No. PCT/IB07/50023, on Feb. 1, 2008.

Scoblete, F., "The Craps Underground. The Inside Story of How Dice Controllers are Winning Millions from the Casinos," Bonus Books, 2004, chapter 10, p. 120.

International Search Report issued in International Patent Application No. PCT/IB2007/53827, on May 22, 2009.

Written Opinion of the International Searching Authority issued in International Patent Application No. PCT/IB2007/53827, on May 22, 2009.

Supplementary European Search Report issued in European Patent Application No. 07826481.9; mailed May 3, 2011.

* cited by examiner

METHOD AND APPARATUS FOR PREVENTING COLLUSIONS IN ONLINE GAMES

RELATED APPLICATIONS

The present invention is a continuation in part of international patent application serial number PCT/IB2007/050023 titled METHOD AND APPARATUS FOR DETECTING COLLUSIONS IN ONLINE GAMES filed on Jan. 4, 2007, the contents of which are incorporated herein by reference.

BACKGROUND

1. Technical Field

The present invention relates to online games in general, and to a method and apparatus for preventing collusions in computer games played over a communication network in particular.

2. Discussion of the Related Art

Computing and network technologies, together with the rising numbers of computer users contribute to the continuous growth of gaming environments offered to online users playing at their homes, offices, internet cafes or any other locations. Some games are played by one or more gamers and do not involve an external operator, while others do involve such operator. Among the games that involve external operators, many games involve payment, such that each player deposits, for example by providing details of a credit card, an amount of money which is lost if the player loses, and is paid back or increased if the player wins, for example by crediting an account. Since the operator or innocent players can not see or talk to the players, this creates a fertile ground for collusions which may involve one or more players cooperating in collusion schemes. Various schemes may be plotted, each scheme may involve one, two or more cooperating players, and may be directed against the game operator or against innocent players. Some schemes may depend on the rules of the specific game in which the schemers participate, while others are independent of the specific game and generally relate to the schemers or to their environment. Such schemes may create enormous damage to innocent players, or to game operators. Such damages may be both direct and indirect damages, wherein indirect damages are caused for example by discouraging innocent players from playing.

Thus, there is a need for a method and apparatus for preventing collusions in on-line games, for blocking or taking other actions against schemers, avoiding loses and protecting innocent gamers. However, a highly suspicious gaming system may become a nuisance and discourage innocent players from playing. Thus, the method and apparatus should be adjustable to various suspicion levels and situations.

SUMMARY

It is an object of the disclosure to provide a novel method and apparatus for preventing collusions in an online poker game, which overcomes the disadvantages of the prior art. In accordance with the disclosure, there is thus provided a method for preventing one or more collusions or collusion attempt situations within an online computerized gaming environment, wherein players participate in one or more games from remote computing platforms over a communication network, the method comprising the steps of: defining one or more collusion or collusion attempt situations; defining one or more actions to be taken when a collusion or collusion attempt situation occurs; associating a specific action selected from the actions with a specific situation selected from the collusion or collusion attempt situations; and performing the specific action. The method can further comprise a step of detecting the specific situation related to the one or more players. The method optionally comprises a step of selecting the specific action from the actions. Within the method, the collusion or collusion attempt situation can be an Internet Protocol related situation, such as a situation in which a first player is performing login from an Internet Protocol address used by a second player for registration, or a situation in which a first player is performing login from an Internet Protocol address used by a second player for performing login. Within the method, the collusion or collusion attempt situation is optionally a situation involving an identifier of the remote computing platform. The situation can be a situation in which a first player is performing login from a computing platform having an identifier equal to an identifier of a remote computing platform used by a second player for registration, or a situation in which a first player is performing login from a computing platform having an identifier equal to an identifier of a remote computing platform used by a second player for performing login. Within the method, the collusion or collusion attempt situation can be a related-players situation. A related-players situation is optionally a situation in which a first player that referred a second player, wherein the first the first player and the second player wish to play together, or a situation in which a first player transferred money to a second player, wherein the first player and the second player wish to play together. The transfer can be a direct transfer or an indirect transfer. Within the method, the collusion or collusion attempt situation is optionally an affiliate-related situation, or a kiosk situation, or a situation in which a player who was previously suspected in fraud registers for playing. Within the method, the action is optionally blocking the player, disabling direct access of the player to a game, determining a minimal number of players to be placed on a queue before a game is opened, random assignment of players to games, or swapping two or more players playing in two or more different games with each other.

Another aspect of the disclosure relates to an apparatus for preventing an a collusion or collusion attempt situation within an online computerized gaming environment, wherein one or more players participate in one of more games from remote computing platforms over a communication network, the apparatus comprising: a situation definition component for defining one or more collusion or collusion attempt situations; an action definition component for defining one or more actions to be taken when the at least one at least one collusion or collusion attempt occurs; an association component for associating the at least one action with the at least one collusion or collusion attempt situation; a situation detection component for detecting the at least one collusion or collusion attempt situation; and an action activation component for performing the at least one action. The apparatus can further comprise an action selection component for selecting n at least one specific action from the at least one action. The apparatus can further comprise an action confirm/override component for confirming or overriding the at least one action. The apparatus optionally comprises a storage device for storing the at least one collusion or collusion attempt situation or the at least one action.

Yet another aspect of the disclosure relates to a computer readable storage medium containing a set of instructions for a general purpose computer, the set of instructions comprising: defining one or more collusion or collusion attempt situations in an online game played by one or more players; defining one or more actions to be taken when the one or more situation occurs; associating an at least one specific action selected from the at least one action with an at least one specific situation selected from the at least one collusion or collusion attempt situation; and performing the at least one specific action.

BRIEF DESCRIPTION OF THE DRAWINGS

The present invention will be understood and appreciated more fully from the following detailed description taken in conjunction with the drawings in which.

DETAILED DESCRIPTION OF THE PREFERRED EMBODIMENT

The present invention overcomes the problem of preventing or reducing collusions and collusion attempts in computer games played over a communication network such as the internet and involving an operator.

In a preferred embodiment of the disclosed invention, the gaming system has information related to each player, regarding information relevant to the player's registration and information related to the player, such as recent or current games he participates in. Such information may relate to the Internet Protocol (IP) address or another identifier of the computer from which the player registered, or the computer from which he or she is playing, registration data, or the like. Having all relevant data, the system can search for and detect suspected situations or players suspected in collusion or collusion attempts, and take a preventive action. The suspicious situations may involve any one or more of the following: two players playing from computers having the same identifier such as the same IP address, two or more players that are related in some way such as players who transferred money to one another, players playing from the same kiosk (the same IP group), players playing from platforms belonging to the same agent or affiliate, two players whose playing times are coordinated, a player who was previously suspected or detected as performing or attempting a fraud, or other situations. The preventive action is optionally any of the following: blocking one or more users from playing, the blocking can be total or temporary, limiting the wager any one or more players can place, waiting until a minimal number of players are accumulated into a waiting list before enabling a game, randomly distributing a waiting list of players into separate games, disabling direct access to games (only via waiting list), sapping players between tables according to a predetermined criteria, asking one or more players for any type of verification, or the like.

The system is preferably configurable. Thus, a user can define, configure, or fine-tune preventive actions and situations that should be recognized.

Figure 1:
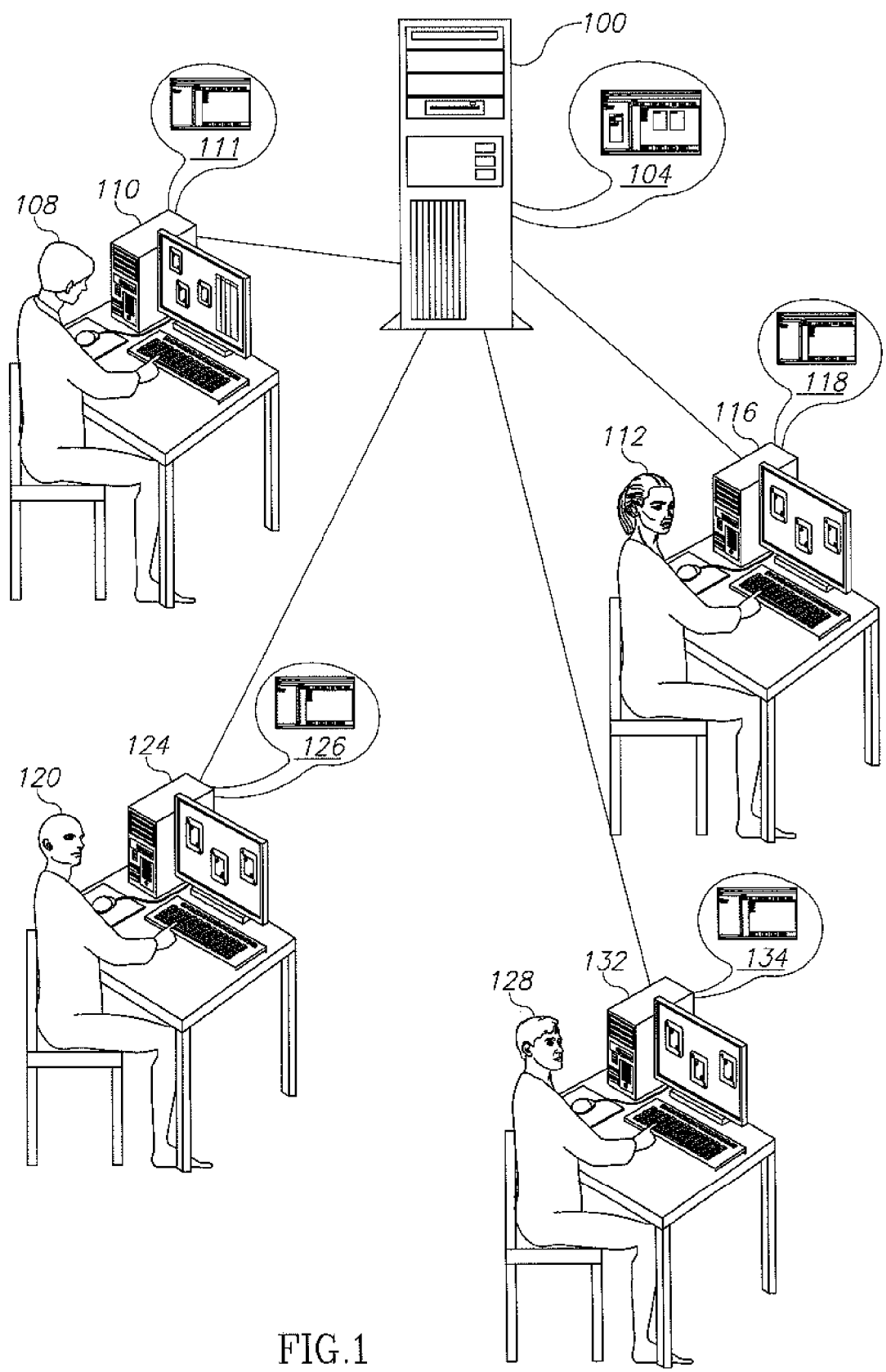
FIG. 1 is a schematic illustration of a typical environment in which the disclosed invention is used.

Referring now to FIG. 1, showing a typical environment in which the disclosed invention is used. The environment comprises a server 100 running an application 104 of a game, such as poker, baccarat, blackjack or any other game in which players may participate. Application 104 preferably comprises components required for executing the game, and also monitoring components for a supervisor, game operator or another person 108. Person 108, associated with an operator of the game, preferably monitors the on going behavior and activities of the system and players thereof through the usage of computing platform 110 running an application 111, which relates beyond the scope of a single player, game or session. Thus person 108 can monitor the system online, issue queries, run research applications, analyze behaviors, or the like. One or more remote players participate in the game through the use of one or more remote computing platforms. Thus, in a non-limiting example player 112 participates using platform 116 running application 118, player 120 participates using platform 124 running application 126 and player 128 participates using platform 132 running application 134. Each of server 100 and platforms 116, 124, 132 is preferably a computing platform such as a personal computer, a mainframe computer, a network computer or any other type of computing platform that is provisioned with a memory device (not shown), a CPU or microprocessor device, and several I/O ports (not shown). Each computing platform is preferably provisioned with input and/or output device, such as a keyboard, a mouse or another pointing device, a monitor, a microphone, loud speakers or similar devices intended for receiving and transmitting information, including information related to the flow of the game or to wagers associated with the game. Alternatively, server 100 or any of platforms 116, 124, 132 can be implemented as hardware or configurable hardware such as field programmable gate array (FPGA) or application specific integrated circuit (ASIC). In yet another alternative, any of platforms 116, 124, 132 can be a cellular phone, a handheld device, a portable computer or any other computing platform provisioned with a CPU and memory. Server 100 is preferably provisioned or in communication with a storage device for storing information related to games played in the past, participants in said games, their activities and other related information. Server 110 and platforms 116, 124, 132 are preferably connected through a communication network such as the internet. Alternatively, two or more units of server 100 and platforms 116, 124, 132 can be connected in a network such as a local area network, a wide area network, a wireless network or the like. Applications 104, 111, 118, 126 and 134 are preferably software applications, comprising executables, scripts, modules, libraries or other components, and written in any programming language, such as C, C++, C#, Java or others and under any development environment or operating system such as Windows, .NET, Linux and others. Each of applications 111, 118, 126, 134 communicates with application 104 running on server 100. In a preferred embodiment of the disclosed invention, application 104 is a server side of an application, such as a client-server application, while applications 111, 118, 126, 134 are the client side. Preferably, application 111 is a client side application with operator privileges, while applications 113, 126 and 134 are client side applications with player privileges. Applications 104, 111, 118, 126, 134 can be web applications accessed through the web, or installed on any computing platform they are being run from. Alternatively, computing platforms 100 and 110 can be the same platform, wherein applications 104 and 111 are the same application, communicating with applications 116, 128 and 134.

Figure 2:
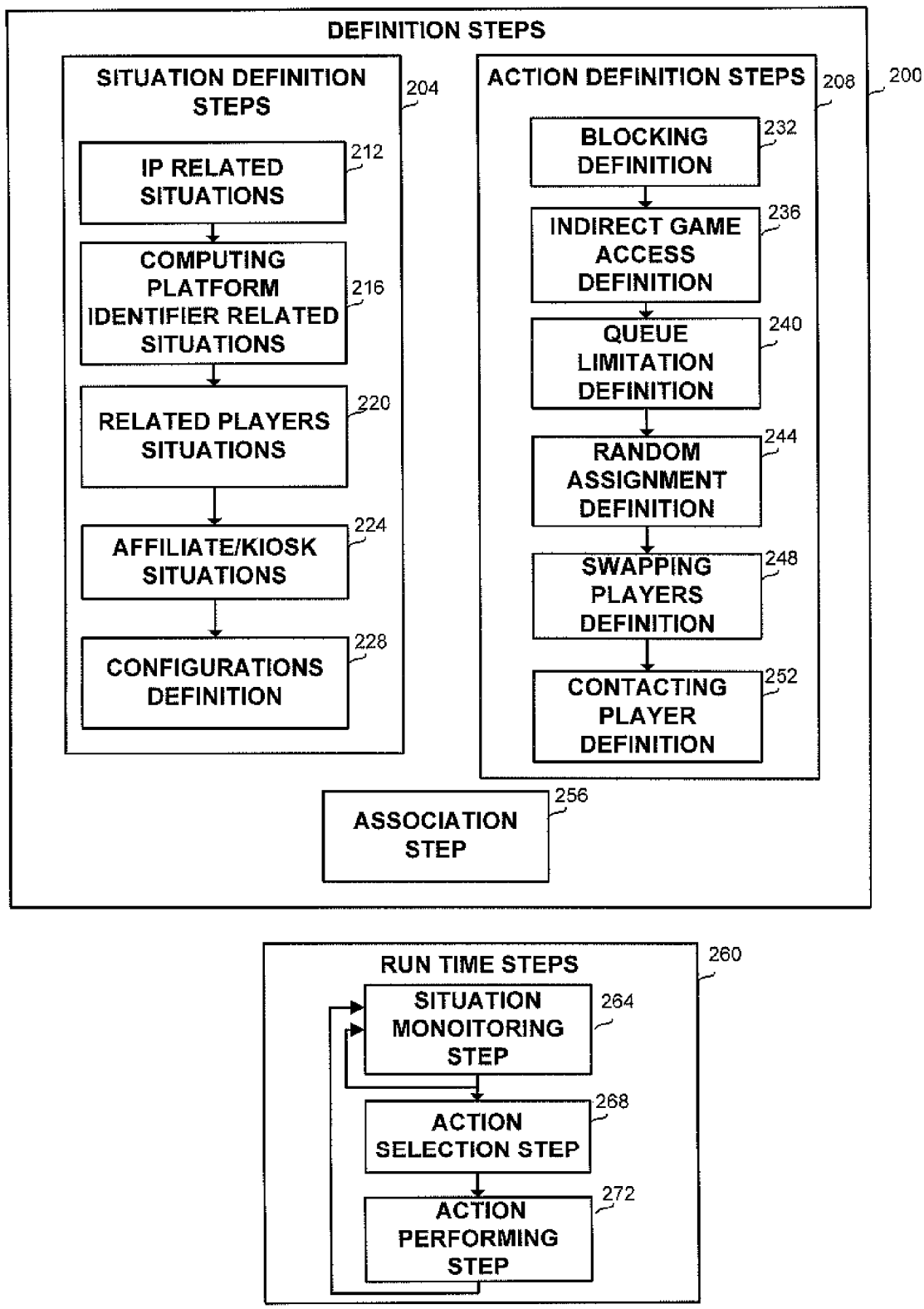
FIG. 2 is a flowchart of the main steps in a preferred embodiment of the method of the disclosed invention.

Referring now to FIG. 2, showing a flowchart of the main steps associated with the method of the disclosed invention. The steps of disclosed method are divided into two main groups: definition steps 200 and action steps 260. Definition steps 200 are preferably performed prior to action steps 260, but they can also be performed at a later stage for adding, deleting or otherwise modifying the system.

Definition steps 200 comprise situation definition steps 204 for defining the situations in which a suspicion to collusion or collusion attempt rises, and action definition steps 208 for defining the actions that should be taken in response to such situations.

Situation definition steps 204 comprise IP related situation definition step 212, for defining possible collusion attempts through an IP address of the computing platform used by one or more players. Such situations may include any one or more of the following: two players playing from the same IP address; a player playing from an IP address from which another player registered; the same player, recognized by the same user name, is tying to login from two or more computing platforms having different IP addresses; or other IP related situations. Another situation definition step is identifier of the computing platform related situation definition step 216. Step 216 is similar to step 212, but involves an identifier of the computing platform used by a player, such as the serial number, rather than the IP address. Situation definition steps 204 further comprise related players situation definition step 220, in which situations related to multiple players are defined. Such situations may include two players that transferred money to one another. A further alternative is an indirect transfer: player A transfers money to player B, and player B transfers money to player C. Thus, the situation should preferably include recognizing players A and B as related, players B and C as related, and also players A and C as related. Other situations may include players who referred one another to the game, players whose playing times and durations overlap beyond a predetermined threshold, or the like. A further situation definition step is affiliate- or kiosk-related situation definition step 224. The situations defined in step 224 include players playing from the same kiosk, internet cafe or are otherwise related to the same affiliate of the gaming operator. Such situations are preferably recognized by IP addresses or other identifiers such as serial numbers of the computing platforms available in a kiosk, as provided by the kiosk operator prior to establishing business with the game operator. Configuration definition step 228 is used for defining parameters for the defined situations or actions, such as thresholds, user preferences or the like. Steps 212, 216, 220, 224 and 228 can be performed at any preferred order. Any of steps 212, 216, 220, 224 and 228 can be omitted, repeated or re-visited before or after any other step. Definition steps 200 further comprise action definition steps 208. Steps 208 include blocking definition step 232, which includes blocking or otherwise limiting one or more players. A player can be totally blocked from further playing, blocked until the detected reason disappears or another condition is met, for example a related player stops playing, the wager that can be placed by the player can be limited, or the like. On indirect game access definition step 236 a user can define if and when direct access to a game table is enabled or disabled. If direct access is disabled, the system has control on routing a player to a table, for example through a queue or a waiting list. A further limitation can be defined on queue limitation step 240, in which a user can define the minimal number of players to be waiting in a queue for a game to be opened. Setting the minimal number so that the players can be arranged in two or more sessions, reduces the chances that two coordinated players will play together, and can thus reduce the attractiveness of a scheme. A further step is random assignment definition step 244, in which a user defines the parameters for randomly assigning players into tables or sessions, in order to reduce the chances that two or more related players will indeed play together. On swapping players definition step 248 the user indicates when and how to swap players playing in different tables between games. The swapping can be random, according to the time a player played on a specific game, or according to any other condition. On step 252 the user defines and implements ways to contact a suspicious player, for example by chat, e-mail or another mechanism in order to communicate with the player, receive further authentication or verification, or for any other purpose. On step 256 the user associates and optionally prioritizes one or more situations defined on situation definition steps 204 with one or more actions defined on action definition steps 208, so that once one or more situations are detected, actions associated with these situations are taken.

Runtime steps 260 comprise situation monitoring step 264, in which the situations defines in steps 204 are searched for. Preferably, step 264 is performed repeatedly in a continuous manner, so that a system according to the disclosed invention continuously checks for the occurrence of the situations are checked. Alternatively, the situations are checked when a certain event happens, such as a new player joining, a player depositing a wager beyond a predetermined sum, or the like. In yet another alternative, a timer event can also trigger an action. Action selection step 268 is performed after one or more situations are detected on step 264. On step 268 one or more actions are selected according to the situation-action association defined on step 256. On step 272 the selected actions are performed, such as blocking one or more players, swapping players or the like.

Figure 3:
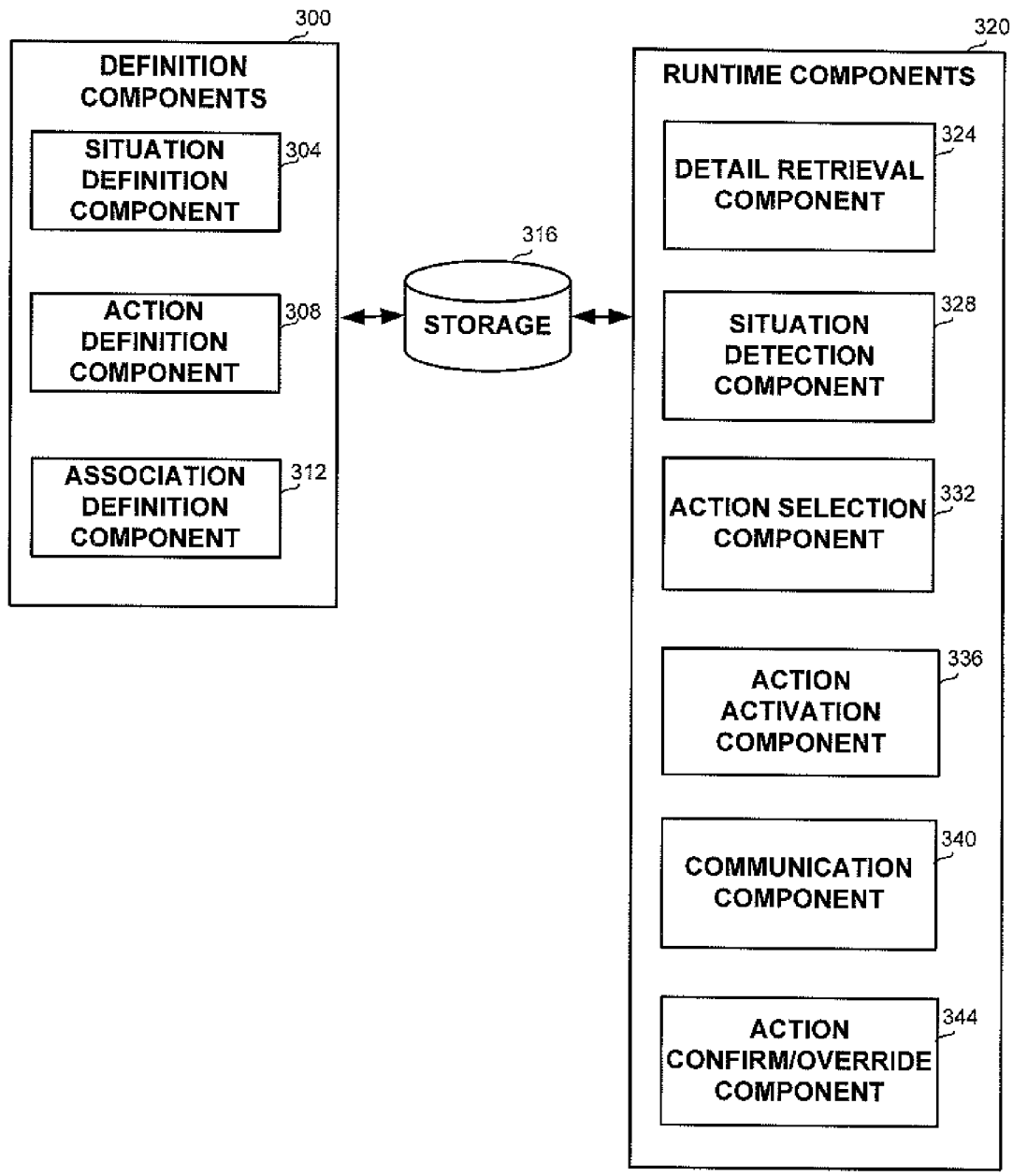
FIG. 3 is a block diagram of the main components in a preferred embodiment of the apparatus of the disclosed invention.

Referring now to FIG. 3, showing a block diagram of the main components in a preferred embodiment of an apparatus according to the disclosed invention. The apparatus is preferably a part of application 104 running on server 100 of FIG. 1. However, parts of the apparatus, especially one or more of runtime components 320 may be implemented as a part of applications 111, 118, 126 or 134. The apparatus comprises definition components 300 and runtime components 320, which are preferably software components implemented using any programming language such as C, C#, C++, Java, VB, VB.Net, or the like, and any development environment, such as .Net, J2EE or others. Definition components 300 comprise situation definition component 304, in which the user defines situations that may raise suspicion of fraud, such as a user trying to login to the system from an IP address which was used by another user for registration. The detected situations include the situations listed in association with steps 204 of FIG. 2 above, and may relate to collusion situations, to collusion attempt situations, or to both. Definition components 300 further comprise action definition component 308, in which a user can define actions to be taken when a decision was made that a preventive action should be taken. The actions include the action types listed in association with steps 208 of FIG. 2 above. A further definition can relate to whether an action is taken automatically when the associated situation is detected, whether a confirmation of a human user is required, or whether an additional parameter is involved, for example a predetermined wager, above which confirmation is required or vice versa. Association component 312 is used for associating one of the situations defined using component 304 with one of the actions defined using component 308. The association is optionally many-to-many, i.e., each situation may be associated with one or more actions, and each action can be activated in response to the detection of one or more situations. The definitions and associations are preferably stored in storage device 316, from which they are fetched by runtime components 320. Storage device 316 is preferably a mass storage device, for example an optical storage device such as a CD, a DVD, or a laser disk; a magnetic storage device such as a tape or a hard disk; a semiconductor storage device such as Flash device, memory stick, or the like.

Runtime components 320 are functional in detecting situations and acting accordingly when one or more players login or play with the system. Runtime components 320 comprise detail retrieval component 324 in which details relevant to one or more players are retrieved from storage 316 or from an alternative storage, storing for each player the IP address and identifier such as serial number of the computing platform from which he registered, a referring players if any, and additional details. The details may also comprise details about previous logins, IP address and identifiers of computing platforms from which the player played, wagers placed, wins, loses or other details. Runtime components 320 optionally comprise situation detection component 328, for checking whether one or more of the situations defined using situation definition component 304 exists at a certain moment. The testing can be performed in a continuous manner, on a time basis, or when triggered by an event, such as a player joining a game. Possibly after one or more situations are detected, one or more actions are selected at step 332. The actions are selected from the actions defined using action definition component 308, and are activated by action activation component 336. Communication component 340 is responsible for communicating the situation, if any, and the action taken to a user such as an operator of the gaming. The user can then override the action using action confirm/override component. In a preferred embodiment, a selected action is first transferred for approval, and is performed only if approved. Alternatively, the action is first performed, and is cancelled if overridden by a user. The preferred mode can be action-dependent, in which case no uniform policy is required. The mode can further be determined according to one or more parameters such as wager exceeding or not a predetermined sum. For example, stopping a player from playing may be performed automatically if the player placed a wager beyond a predetermined sum, and after receiving confirmation from a user otherwise. Alternatively, a decision whether to confirm or override the actions can be taken after opening a communication channel with the player, such as a chat, an e-mail, a telephone call or the like. It will be appreciated by a person skilled in the art that the division of the disclosed apparatus into components is exemplary only and divisions can be used without departing from the spirit of the current invention.

The disclosed method and apparatus are functional in preventing collusions and collusion attempts by players participating in on-line games. The disclosed method and apparatus are not limited to the mentioned situations and actions, which are provided merely as examples. Rather, additional situations and actions can be devised, such as blocking a player who was previously suspected in collusion or collusion attempt. It should be appreciated that one or more actions can be defined and taken without defining or detecting any situation, as a general precaution. Such actions may include limiting the number of players required for opening a new game not to go under a predetermined number.

It will further be appreciated by persons skilled in the art that the present invention is not limited to what has been particularly shown and described hereinabove. Rather the scope of the present invention is defined only by the claims which follow.

The invention claimed is:

1. A method of operating an online computerized gaming system to prevent collusion between players of at least one game, the system comprising a processor configured to execute the method and a memory in communication with the processor, the method comprising:
   storing in the memory of the computerized gaming system one or more collusion or collusion attempt situations and one or more actions to be taken when a said collusion or collusion attempt situation occurs, said one or more collusion or collusion attempt situations being characterized, at least, by a relationship between Internet Protocol (IP) addresses related to respective computing platforms;
   associating in the memory at least one specific action selected from said one or more actions with at least one specific situation selected from said one or more collusion or collusion attempt situations; and
   performing, using the processor, said at least one associated specific action responsive to detecting said at least one specific situation,
   wherein said at least one specific situation is detected by comparing (i) a first IP address received from a computing platform of a first player during login and (ii) a second IP address received from a computing platform of a second player during registration, the second IP address being different than an IP address received from a computing platform of the second player during login.

2. The method of claim 1 further comprising a step of detecting the at least one specific situation related to at least one player participating from a remote platform.

3. The method of claim 1 further comprising a step of selecting the at least one specific action from said one or more actions.

4. The method of claim 1 wherein said at least one specific situation is detected by comparing with an IP address related to a remote computing platform.

5. The method of claim 1 wherein detecting said at least one specific situation has resulted in identifying the login computing platform of the first player and the registration computing platform of the second player as belonging to the same affiliate of a gaming operator.

6. The method of claim 1 wherein detecting said at least one specific situation has resulted in identifying the login computing platform of the first player and the registration computing platform of the second player as belonging to the same predefined group of Internet Protocol (IP) addresses.

7. The method of claim 1 wherein the at least one specific action is blocking at least one player.

8. The method of claim 1 wherein the at least one specific action involves disabling direct access of at least one player to a game.

9. The method of claim 1 wherein the at least one specific action is determining a minimal number of players to be placed on a queue before a game is opened or the at least one specific action is random assignment of players to games.

10. The method of claim 1 wherein the at least one specific action is swapping at least two players playing in at least two different games with each other.

11. A computerized gaming apparatus operative to prevent collusion between players of at least one game, the apparatus comprising:
   a processor operatively coupled to a storage unit,
   wherein the storage unit is operable to store one or more preconfigured collusion or collusion attempt situations and one or more preconfigured actions to be taken when a said collusion or collusion attempt situation occurs,
   wherein said one or more collusion or collusion attempt situations are characterized, at least, by a relationship between Internet Protocol (IP) addresses related to the respective computing platforms,
   wherein the processor is configured to associate at least one specific action selected from said one or more preconfigured actions with at least one specific collusion or collusion attempt situation selected from said one or more preconfigured collusion attempt situations and, in response to detecting said at least one specific situation, to activate said at least one specific action, and wherein said at least one specific situation is detected by comparing (i) first IP address received from a computing platform of a first player during login and (ii) a second IP address received from a computing platform of a second player during registration, the second IP address being different than an IP address received from a computing platform of the second player during login.

12. The apparatus of claim 11 wherein the processor is further configured to enable confirming or overriding said at least one specific action before activating.

13. A non-transitory computer-readable medium having computer-readable program code therein that embodies a computer program enabling the operation of an online computerized gaming system to prevent collusion when at least one player participates in at least one game over a communication network, the computer program comprising:

computer readable program code for causing a computer to store configuration information, said configuration information defining one or more collusion or collusion attempt situations and one or more actions to be taken when a said collusion or collusion attempt situation occurs, said one or more collusion or collusion attempt situations being characterized, at least, by a relationship between Internet Protocol (IP) addresses related to respective computing platforms;

computer readable program code for causing the computer to associate at least one specific action selected from said one or more actions with at least one specific situation selected from said one or more collusion or collusion attempt situations; and computer readable program code for causing the computer to perform said at least one associated specific action responsive to detecting said at least one specific situation, wherein said at least one specific situation is detected by comparing (i) a first IP address received from a computing platform of a first player during login and (ii) a second IP address received from a computing platform of a second player during registration, the second IP address being different than an IP address received from a computing platform of the second player during login.

\* \* \* \* \*